(12) United States Patent
Fiacco et al.

(10) Patent No.: US 11,500,149 B2
(45) Date of Patent: Nov. 15, 2022

(54) OPTICAL FIBER WITH NITROGEN AND CHLORINE CO-DOPED CORE

(71) Applicant: CORNING INCORPORATED, Corning, NY (US)

(72) Inventors: Richard Michael Fiacco, Corning, NY (US); Kenneth Edward Hrdina, Horseheads, NY (US); Ming-Jun Li, Horseheads, NY (US); Jeffery Scott Stone, Addison, NY (US); Haitao Zhang, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/236,558

(22) Filed: Apr. 21, 2021

(65) Prior Publication Data

US 2021/0349257 A1    Nov. 11, 2021

Related U.S. Application Data

(60) Provisional application No. 63/021,973, filed on May 8, 2020.

(51) Int. Cl.
   *G02B 6/036*    (2006.01)
   *C03B 37/014*    (2006.01)
   *C03C 13/04*    (2006.01)

(52) U.S. Cl.
   CPC .... *G02B 6/03616* (2013.01); *C03B 37/01453* (2013.01); *C03C 13/046* (2013.01); *C03B 2201/12* (2013.01); *C03B 2201/20* (2013.01); *C03C 2201/11* (2013.01); *C03C 2201/12* (2013.01)

(58) Field of Classification Search
   CPC .................................................. G02B 6/03616
   See application file for complete search history.

(56) References Cited

U.S. PATENT DOCUMENTS

| 7,844,155 B2* | 11/2010 | Bickham | C03B 37/0124 |
| | | | 385/126 |
| 9,776,907 B2* | 10/2017 | Bookbinder | C03B 37/014 |
| 9,802,858 B2* | 10/2017 | Bookbinder | C03B 37/014 |
| 2008/0279515 A1* | 11/2008 | Bickham | G02B 6/02333 |
| | | | 385/123 |

(Continued)

FOREIGN PATENT DOCUMENTS

EP    2645139 A2    10/2013

OTHER PUBLICATIONS

O.V. Butov et al., Refractive index dispersion of doped silica for fiber optics, Optics Communications 213 (2002) 301-308 (Year: 2002).*

(Continued)

*Primary Examiner* — Peter Radkowski
(74) *Attorney, Agent, or Firm* — Kevin L. Bray

(57) ABSTRACT

An optical fiber can include a core comprising silica co-doped with nitrogen and chlorine and an outer cladding surrounding the core. In some aspects, the core can be characterized by an annealing temperature of less than or equal to about 1150° C. and/or the core can include a relative refractive index $\Delta_{core}$ in a range of from about 0.15% to about 0.45%.

20 Claims, 7 Drawing Sheets

(56) References Cited

U.S. PATENT DOCUMENTS

2016/0075591 A1* 3/2016 Bookbinder ....... G02B 6/03638
                                                                                65/397
2016/0304392 A1* 10/2016 Bookbinder .......... C03C 13/045

OTHER PUBLICATIONS

M. Lancry et al., Fictive temperature in silica-based glasses and its application to optical fiber manufacturing, Progress in Materials Science 57 (2012) 63-94 (Year: 2012).*
Shen et al., Thermal annealing of laser damage precursors on fused silica surfaces, Optical Engineering 51(12), 121817 (Dec. 2012) (Year: 2012).*
Golant et al., "Nitrogen-doped silica fibers and fiber-based optoelectronic components", In Proceedings of SPIE "Advances in Fiber Optics" (Eugeny M. Dianov ed.), vol. 4083, 2000, pp. 2-11.
Tsukuma et al., "High temperature viscosity of nitrogen modified silica glass", In Journal of Non-Crystalline Solids, vol. 265, Issue 3, Mar. 2000, pp. 199-209.
Butov et al., "Refractive index dispersion of doped silica for fiber optics" Optics Communications, Elsevier, Amsterdam, NL, vol. 213, No. 4-6, Dec. 1, 2002, pp. 301-308. XP004393879.
Girard et al., "Gamma-rays and pulsed X-ray radiation responses of nitrogen-, germanium-doped and pure silica core optical fibers", Nuclear Instruments and Methods in Physics Research Section B Beam Interactions with Materials and Atoms vol. 215, No. 1-2, Jan. 2004, pp. 187-195. XP004484279.
International Search Report and Written Opinion of the International Searching Authority; PCT/US2021/028805 dated Jul. 5, 2021, 10 pages; European Patent Office.

* cited by examiner

OPTICAL FIBER WITH NITROGEN AND CHLORINE CO-DOPED CORE

This Application claims priority under 35 USC § 119(e) from U.S. Provisional Patent Application Ser. No. 63/021,973 filed on May 8, 2020 which is incorporated by reference herein in its entirety.

FIELD

The present disclosure generally relates to optical fibers having a silica core doped with nitrogen, and more particularly to optical fibers having a silica core co-doped with nitrogen and chlorine.

BACKGROUND

Conventional standard single mode silica-based optical fibers typically have a relative refractive index of about 0.35%. These standard single mode optical fibers often include a silica core doped with germanium and a cladding including silica doped with fluorine to provide a desired refractive index profile. Germanium dopants have been found to decrease the core viscosity, which can reduce Rayleigh scattering loss. However, in some cases, it may be desired to replace the germanium core dopant with other dopants that can increase the refractive index of silica in the core without significantly adding to the optical attenuation of the optical fiber. However, it can be challenging to dope a silica core with materials other than germanium, while still achieving a relative refractive index and core viscosity similar to that typically required of a conventional standard single mode optical fiber.

In view of these considerations, there is a need for optical fibers that include core dopants other than germanium, and which have the desired relative refractive index and core viscosity.

SUMMARY

According to an embodiment of the present disclosure, an optical fiber includes a core having silica co-doped with nitrogen and chlorine, the core having a relative refractive index $\Delta_{core}$ and a radius $r_{core}$ and an outer cladding surrounding the core, the outer cladding have a relative refractive index $\Delta_{OC} < \Delta_{core}$.

According to another embodiment, an optical fiber includes a core having silica co-doped with from about 0.30 wt % to about 0.60 wt % nitrogen and from about 0.8 wt % to about 2 wt % chlorine, the core having a relative refractive index $\Delta_{core}$ in a range of from about 0.15% to about 0.45%, and an outer cladding surrounding the core and having a relative refractive index $\Delta_{OC} < \Delta_{core}$.

These and other aspects, objects, and features of the present disclosure will be understood and appreciated by those skilled in the art upon studying the following specification, claims, and appended drawings.

DETAILED DESCRIPTION

Figure 1:
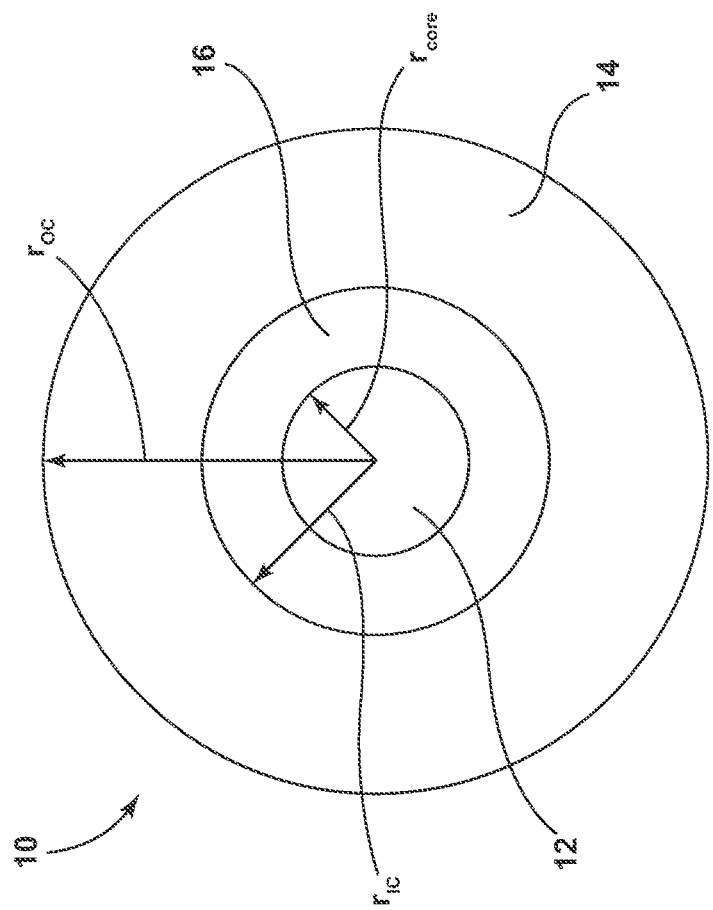
FIG. 1 is a schematic cross-sectional view of an optical fiber, according to an embodiment of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about" It will be further understood that the endpoints of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

"Radial position," "radial distance," when used in reference to the radial coordinate "r" refers to radial position relative to the centerline (r=0) of an optical fiber.

The length dimension "micrometer" may be referred to herein as micron (or microns) or µm.

The "refractive index profile" is the relationship between refractive index or relative refractive index and radial distance r from the core's centerline. For relative refractive index profiles depicted herein as having step boundaries between a core and adjacent cladding region, normal variations in processing conditions may result in step boundaries at the interface of adjacent regions that are not sharp. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the inner and/or outer cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

The "relative refractive index" or "relative refractive index percent" as used herein with respect to optical fibers and fiber cores of multicore optical fibers is defined according to equation (1):

$$\Delta \% = 100 \frac{n^2(r) - n_c^2}{2n^2(r)} \quad (1)$$

where n(r) is the refractive index at the radial distance r from the core's centerline at a wavelength of 1550 nm, unless otherwise specified, and $n_c$ is 1.444, which is the refractive index of undoped silica glass at a wavelength of 1550 nm. As used herein, the relative refractive index is represented by Δ (or "delta") or Δ % (or "delta %") and its values are given in units of "%" or "% Δ", unless otherwise specified. Relative refractive index may also be expressed as Δ(r) or Δ(r) %. When the refractive index of a region is less than the reference index $n_c$, the relative refractive index is negative and can be referred to as a trench. When the refractive index of a region is greater than the reference index $n_c$, the relative refractive index is positive and the region can be said to be raised or to have a positive index.

The average relative refractive index of a region of the optical fiber can be defined according to equation (2):

$$\Delta \% = \frac{\int_{r_{inner}}^{r_{outer}} \Delta(r) dr}{(r_{outer} - r_{inner})} \quad (2)$$

where $r_{inner}$ is the inner radius of the region, $r_{outer}$ is the outer radius of the region, and Δ(r) is the relative refractive index of the region.

The term "α-profile" (also referred to as an "alpha profile") refers to a relative refractive index profile Δ(r) that has the following functional form (3):

$$\Delta(r) = \Delta(r_0) \left[ 1 - \frac{|r - r_0|}{(r_1 - r_0)} \right]^\alpha \quad (3)$$

where $r_0$ is the point at which Δ(r) is maximum, $r_1$ is the point at which Δ(r) is zero, and r is in the range $r_i \leq r \leq r_f$, where $r_i$ is the initial point of the α-profile, $r_f$ is the final point of the α-profile, and α is a real number. In some embodiments, examples shown herein can have a core alpha of $1 \leq \alpha \leq 100$. In practice, an actual optical fiber, even when the target profile is an alpha profile, some level of deviation from the ideal configuration can occur. Therefore, the alpha parameter for an optical fiber may be obtained from a best fit of the measured index profile, as is known in the art.

The term "graded-index profile" refers to an α-profile, where α<10. The term "step-index profile" refers to α-profile, where α≥10.

The "effective area" can be defined as (4):

$$A_{eff} = \frac{2\pi \left[ \int_0^\infty (f(r))^2 r dr \right]^2}{\int_0^\infty (f(r))^4 r dr} \quad (4)$$

where f(r) is the transverse component of the electric field of the guided optical signal and r is radial position in the fiber. "Effective area" or "$A_{eff}$" depends on the wavelength of the optical signal. Specific indication of the wavelength will be made when referring to "Effective area" or "$A_{eff}$" herein. Effective area is expressed herein in units of "µm$^2$", "square micrometers", "square microns" or the like.

The "mode field diameter" or "MFD" of an optical fiber is defined as MFD=2w, where w is defined as (5):

$$w^2 = \frac{\int_0^\infty (f(r))^2 r dr}{\int_0^\infty \left( \frac{df(r)}{dr} \right)^2 r dr} \quad (5)$$

where f(r) is the transverse component of the electric field distribution of the guided optical signal and r is radial position in the fiber. "Mode field diameter" or "MFD" depends on the wavelength of the optical signal. Specific indication of the wavelength will be made when referring to "mode field diameter" or "MFD" herein.

"Chromatic dispersion", herein referred to as "dispersion" unless otherwise noted, of an optical fiber is the sum of the material dispersion, the waveguide dispersion, and the inter-modal dispersion. In the case of single mode waveguide fibers, the inter-modal dispersion is zero. Dispersion values in a two-mode regime assume intermodal dispersion is zero. The zero dispersion wavelength ($\lambda_0$) is the wavelength at which the dispersion has a value of zero. Dispersion slope is the rate of change of dispersion with respect to wavelength. Dispersion and dispersion slope are reported herein at a wavelength of 1310 nm or 1550 nm, as noted, and are expressed in units of ps/nm/km and ps/nm$^2$/km, respectively The cutoff wavelength of an optical fiber is the minimum wavelength at which the optical fiber will support only one propagating mode. For wavelengths below the cutoff wavelength, multimode transmission may occur and an additional source of dispersion may arise to limit the fiber's information carrying capacity. Cutoff wavelength will be reported herein as a cable cutoff wavelength. The cable cutoff wavelength is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA).

The "theoretical cutoff wavelength", or "theoretical fiber cutoff", or "theoretical cutoff", for a given higher-order mode, is the wavelength above which guided light cannot propagate in that higher-order mode. According to an aspect of the present disclosure, the cutoff wavelength refers to the cutoff wavelength of the LP11 mode. A mathematical definition can be found in Single Mode Fiber Optics, Jeunhomme, pp. 39-44, Marcel Dekker, New York, 1990, wherein the theoretical fiber cutoff is described as the wavelength at which the mode propagation constant becomes equal to the plane wave propagation constant in the common cladding. This theoretical wavelength is appropriate for an infinitely long, perfectly straight fiber that has no diameter variations.

The "pin array" bend test can be used to compare the relative resistance of an optical fiber to bending. Values reported herein for the pin array bend test were determined by measuring the attenuation loss for an optical fiber with essentially no induced bending loss. The optical fiber was then woven about a pin array and attenuation was again measured. The loss induced by bending is the difference between the two measured attenuations. The pin array was a set of ten cylindrical pins arranged in a single row and held in a fixed vertical position on a flat surface. The pin spacing was 5 mm, center to center, and the pin diameter was 0.67 mm during testing. Sufficient tension is applied to make the optical fiber conform to a portion of the pin surface.

The lateral load test can be used to provide a measure of the micro-bending resistance of the optical fiber. The values reported herein for the lateral load test were determined by placing a prescribed length of optical fiber between two flat plates. A No. 70 wire mesh was then attached to one of the plates. The known length of optical fiber was sandwiched between the plates and the reference attenuation as measured while the plates are pressed together with a force of 30 newtons. A 70 newton force was then applied to the plates and the increase in attenuation and dB/m was measured. An increase in attenuation is the lateral load attenuation (dB/m) of the optical fiber.

As used herein, free or substantially free with respect to a particular constituent are used interchangeably to mean that the particular constituent was not intentionally added to a material forming a core or cladding matrix material. It is understood that trace amounts of materials may be present due to impurities and/or contaminants in source materials and/or processing equipment.

As used herein, the terms "glass annealing temperature" and "annealing temperature" are used interchangeably to refer to a temperature at which a viscosity of the glass is $1 \times 10^{13}$ Poise. The annealing temperature values reported herein were determined using the beam bending viscosity (BBV) method on a glass sample, either a bulk glass sample or a glass cane preform (prior to drawing into an optical fiber). For the purposes of the present disclosure, the annealing temperature of the glass sample is assumed to be substantially the same as the annealing temperature of the sample after drawing to form an optical fiber. Beam bending viscosity can be determined according to the method described in the International Organization for Standardization International Standard ISO-7884-4, First edition 1987-12-15, entitled "Glass—Viscosity and viscometric fixed points—Part 4: Determination of viscosity by beam bending" or ASTM International standard ASTM C598-93 (2019), entitled "Standard Test Method for Annealing Point and Strain Point of Glass by Beam Bending."

The concentration of chlorine in a glass sample, including a bulk glass sample, a glass cane preform, and an optical fiber, as reported herein, was determined by elemental analysis using electron probe microanalysis (EPMA). EPMA works by bombarding a micro-volume of a sample with a focused electron beam (typical energy=5-30 keV) and collecting the X-ray photons thereby emitted by the elemental species present in the sample. The sample composition can then be identified by recording wavelength dispersive spectroscopy (WDS) spectra.

The concentration of nitrogen in a glass sample, including a bulk glass sample, a glass cane preform, and an optical fiber, as reported herein, was determined using LECO combustion elemental analysis. Nitrogen doped silica samples were ground into a powder and then heated to about 2000° C. to decompose the sample. The $N_2$ released from the decomposition of the sample was collected and used to determine the nitrogen concentration in the nitrogen-doped silica sample. To determine the concentration of nitrogen in a core of an optical fiber, the concentration of nitrogen in the entire optical fiber can be determined using LECO elemental analysis and then a calculated concentration of nitrogen in the core can be determined based on the dimensions of the core relative to the dimensions of the cladding material.

The present illustrated embodiments generally relate to optical fibers having a silica glass core co-doped with nitrogen and chlorine. According to some embodiments, the nitrogen and chlorine co-doped silica glass can be characterized by an annealing temperature of less than or equal to about 1150° C. and/or a relative refractive index Δ in a range of from about 0.15% to about 0.45%. Accordingly, elements of the present disclosure have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Embodiments of the present disclosure generally relate to an optical fiber having a core that includes silica glass co-doped with nitrogen and chlorine. According to one embodiment, the optical fibers of the present disclosure include a core of silica glass co-doped with nitrogen and chlorine. The nitrogen and chlorine co-doped silica glass can be characterized by an annealing temperature of less than or equal to about 1150° C. and/or a relative refractive index $\Delta$ in a range from about 0.15% to about 0.45%. The combination of nitrogen doping and chlorine doping in a silica-based core can provide a material having a relative refractive index that is tunable within a desired range. The combination of nitrogen doping and chlorine doping in a silica-based core may also provide a material having a desired viscosity, as measured by determining an annealing temperature of the nitrogen and chlorine co-doped silica-based glass core.

Nitrogen doping of silica can be used to incrementally adjust the relative refractive index of the material. However, as the concentration of doped nitrogen increases, a viscosity of the material and/or a sintering temperature of the material may also increase. An increase in the viscosity of a material may result in an increase in attenuation due to Rayleigh scattering. Chlorine doping of silica can also be used to incrementally adjust the relative refractive index of the material. As the concentration of doped chlorine increases, a viscosity of the material and/or a sintering temperature of the material may decrease. However, the amount of chlorine dopant required to achieve a particular incremental increase in the relative refractive index of the material is greater than the amount of nitrogen dopant required to achieve the same incremental increase in the relative refractive index. The embodiments of the present disclosure relate to optical fibers having silica cores co-doped with nitrogen and chlorine in which a concentration of each dopant is selected in concert to provide the core with a desired viscosity and/or relative refractive index. In some embodiments, the silica core can be co-doped with nitrogen and chlorine and also be substantially free of germanium.

FIG. 1 illustrates a cross-sectional view of an optical fiber 10 according to embodiments of the present disclosure. The optical fiber 10 can include a core 12 surrounded by an outer cladding 14. Optionally, one or more inner cladding region 16 may be provided around the core 12 between the core 12 and the outer cladding 14. The core 12 can have an outer radius $r_{core}$ and a relative refractive index $\Delta_{core}$. The outer cladding 14 can have an outer radius $r_{OC}$ and a relative refractive index $\Delta_{OC}$. When present, the inner cladding 16 can have an outer radius $r_{IC}$ and a relative refractive index $\Delta_{IC}$.

In some embodiments, the core 12 can form a central portion of the optical fiber 10 and may be substantially cylindrical in shape. In addition, when present, the surrounding inner cladding 16 can be substantially annular in shape. Annular regions may be characterized in terms of an inner radius and an outer radius. Radial positions r refer herein to the outermost radii of the region (e.g., the core, the inner cladding, etc. . . . ). When two regions are directly adjacent to each other, the outer radius of the inner of the two regions coincides with the inner radius of the outer of the two regions. For example, in embodiments in which an inner cladding region surrounds and is directly adjacent to a core region, the outer radius of the core region coincides with the inner radius of the inner cladding region and the outer radius of the inner cladding region is separated from the inner radius of the inner cladding region by the width $\delta r_{IC}$.

According to one embodiment, the outer cladding 14 can be formed from a cladding matrix that includes undoped silica glass or doped silica glass. According to one embodiment, the outer cladding 14 is undoped silica glass. According to another embodiment of the present disclosure, the outer cladding 14 is doped silica glass that includes one or more up-dopants and/or one or more down-dopants. As used herein, the term "up-dopant" is used to refer to a dopant that increases the refractive index relative to pure, undoped silica glass. Non-limiting examples of up-dopants include chlorine ("Cl"), bromine ("Br"), germanium dioxide ("$GeO_2$"), aluminum trioxide ("$Al_2O_3$"), phosphorus pentoxide ("$P_2O_5$"), and titanium dioxide ("$TiO_2$"). As used herein, the term "down-dopant" is used to refer to a dopant that decreases the refractive index relative to pure, undoped silica glass. Non-limiting examples of down-dopants include fluorine ("F") and boron ("B"). In one example, the outer cladding 14 can include undoped silica glass. In another example, the outer cladding 14 can include silica glass doped with chlorine.

According to one embodiment, when present, the inner cladding 16 can be formed from an inner cladding matrix that includes undoped silica glass or doped silica glass. According to one embodiment, the inner cladding 16 is undoped silica glass. According to another embodiment of the present disclosure, the inner cladding 16 is doped silica glass that includes one or more up-dopants and/or one or more down-dopants. Non-limiting examples of up-dopants that can be included in the inner cladding 16 include chlorine ("Cl"), bromine ("Br"), germanium dioxide ("$GeO_2$"), aluminum trioxide ("$Al_2O_3$"), phosphorus pentoxide ("$P_2O_5$"), and titanium dioxide ("$TiO_2$"). Non-limiting examples of down-dopants that can be included in the inner cladding 16 include fluorine ("F") and boron ("B"). In one example, the inner cladding 16 can include undoped silica glass. In another example, the inner cladding 16 can include silica glass doped with fluorine.

For some dopants, the change in refractive index relative to undoped silica glass varies linearly as a function of dopant concentration. For example, up-doping with $GeO_2$ can result in a relative refractive index due to Ge ("$\Delta Ge$ %") that can be estimated as a function of concentration of $GeO_2$, in weight percent ("wt % of $GeO_2$"), by the following equation: $\Delta Ge$ %=0.0601*(wt % of $GeO_2$). In another example, down-doping with fluorine can result in a relative refractive index due to F ("$\Delta F$ %") that can be estimated as a function of concentration of F, in weight percent ("wt % of F"), by the following equation: $\Delta F$ %=−0.3053*(wt % of F). In another example, up-doping with chlorine can result in a relative refractive index due to Cl ("$\Delta Cl$ %") that can be estimated as a function of concentration of Cl, in weight percent ("wt % of Cl"), by the following equation: $\Delta Cl$ %=0.063*(wt % of Cl). The amount of dopant in the silica glass of the cladding matrix and the inner cladding matrix can be selected to provide the outer cladding 14 and/or inner cladding 16 with one or more desired characteristics, non-limiting examples of which include a relative refractive index and a viscosity.

In some embodiments, the outer cladding 14 can be characterized by a relative refractive index $\Delta_{OC}$ of greater than or equal to 0%, or greater than 0%. For example, the outer cladding 14 can be characterized by a relative refractive index $\Delta_{OC}$ of from 0% to about 0.2%, 0% to about 0.1%, 0% to about 0.07%, 0.02% to about 0.2%, or 0.02% to about 0.1%. However, it is understood that other outer cladding matrix material having different dopants and/or relative refractive indices can be used in the outer cladding 14 in combination with the nitrogen and chlorine co-doped core 12 according to embodiments of the present disclosure without deviating from the scope of the present disclosure.

The inner cladding 16 can be characterized by a relative refractive index $\Delta_{IC}$ of less than or equal to 0%, or less than 0%. For example, the inner cladding 16 can be characterized by a relative refractive index $\Delta_{IC}$ of from 0% to about −0.2%, 0 to about −0.1%, 0% to about −0.07%, −0.02% to about −0.2%, or −0.02% to about −0.1%. However, it is understood that other inner cladding matrix material having different dopants and/or relative refractive indices can be used in the inner cladding 16 in combination with the nitrogen and chlorine co-doped core 12 according to embodiments of the present disclosure without deviating from the scope of the present disclosure.

According to an embodiment of the present disclosure, the core 12 can include silica glass that is co-doped with nitrogen and chlorine. In some embodiments, the core 12 can include silica glass that is co-doped with nitrogen and chlorine and which is substantially free of germanium. The amount of nitrogen dopant and chlorine dopant can be selected to provide the core 12 with one or more desired characteristics, examples of which include a desired viscosity and a desired relative refractive index $\Delta_{core}$. In one embodiment, the core 12 can include silica glass doped with from about 0.30% to about 0.60% by weight (wt %) nitrogen. In another embodiment, the core 12 can include silica glass doped with from about 0.8 wt % to about 2 wt % chlorine. In some embodiments, the core 12 can include silica glass doped with from about 0.30% to about 0.60% by weight (wt %) nitrogen and from about 0.8 wt % to about 2 wt % chlorine. For example, the core 12 can include silica glass doped with nitrogen from about 0.30 wt % to about 0.60 wt %, about 0.30 wt % to about 0.50 wt %, about 0.30 wt % to about 0.40 wt %, 0.35 wt % to about 0.60 wt %, about 0.35 wt % to about 0.50 wt %, about 0.35 wt % to about 0.40 wt %, about 0.40 wt % to about 0.60 wt %, about 0.40 wt % to about 0.50 wt %, or about 0.50 wt % to about 0.60 wt %. In another example, the core 12 can include silica glass doped with chlorine from about 0.8 wt % to about 2 wt %, about 0.8 wt % to about 1.5 wt %, about 0.8 wt % to about 1.25 wt %, about 0.8 wt % to about 1 wt %, about 1 wt % to about 2 wt %, about 1 wt % to about 1.5 wt %, about 1 wt % to about 1.25 wt %, about 1.1 wt % to about 2 wt %, about 1.1 wt % to about 1.5 wt %, about 1.1 wt % to about 1.25 wt %, about 1.25 wt % to about 2 wt %, about 1.25 wt % to about 1.5 wt %, or about 1.5 wt % to about 2 wt %. In another example, the core 12 can include silica glass doped with nitrogen from about 0.30 wt % to about 0.60 wt %, about 0.30 wt % to about 0.50 wt %, about 0.30 wt % to about 0.40 wt %, 0.35 wt % to about 0.60 wt %, about 0.35 wt % to about 0.50 wt %, about 0.35 wt % to about 0.40 wt %, about 0.40 wt % to about 0.60 wt %, about 0.40 wt % to about 0.50 wt %, or about 0.50 wt % to about 0.60 wt % and doped with chlorine from about 0.8 wt % to about 2 wt %, about 0.8 wt % to about 1.5 wt %, about 0.8 wt % to about 1.25 wt %, about 0.8 wt % to about 1 wt %, about 1 wt % to about 2 wt %, about 1 wt % to about 1.5 wt %, about 1 wt % to about 1.25 wt %, about 1.1 wt % to about 2 wt %, about 1.1 wt % to about 1.5 wt %, about 1.1 wt % to about 1.25 wt %, about 1.25 wt % to about 2 wt %, about 1.25 wt % to about 1.5 wt %, or about 1.5 wt % to about 2 wt %.

In some embodiments, the core 12 can include silica glass co-doped with nitrogen and chlorine in amounts sufficient to provide the core 12 with a relative refractive index $\Delta_{core}$ of from about 0.15% to about 0.45%. For example, the core 12 can have a relative refractive index $\Delta_{core}$ of from about 0.15% to about 0.45%, about 0.15% to about 0.40%, about 0.15% to about 0.35%, about 0.15% to about 0.30%, about 0.15% to about 0.25%, about 0.15% to about 0.20%, about 0.20% to about 0.45%, about 0.20% to about 0.40%, about 0.20% to about 0.35%, about 0.20% to about 0.30%, about 0.20% to about 0.25%, about 0.25% to about 0.45%, about 0.25% to about 0.40%, about 0.25% to about 0.35%, about 0.25% to about 0.30%, about 0.30% to about 0.45%, about 0.30% to about 0.40%, about 0.30% to about 0.35%, about 0.35% to about 0.45%, or about 0.35% to about 0.40%. In some examples, the core 12 can be characterized by a relative refractive index $\Delta_{core}$ of about 0.35%.

In some embodiments, the core 12 can include silica glass co-doped with nitrogen and chlorine and characterized by an annealing temperature that is less than or equal to about 1150° C. For example, the core 12 can include silica glass co-doped with nitrogen and chlorine and characterized by an annealing temperature that is less than or equal to about 1150° C., less than or equal to about 1148° C., less than or equal to about 1140° C., less than or equal to about 1130° C., less than or equal to about 1120° C., less than or equal to about 1110° C., or less than or equal to about 1100° C. In some examples, the core 12 can include silica glass co-doped with nitrogen and chlorine and characterized by an annealing temperature that is from about 1000° C. to about 1150° C., about 1100° C. to about 1150° C., about 1110° C. to about 1150° C., about 1120° C. to about 1150° C., about 1300° C. to about 1150° C., about 1140° C. to about 1150° C., about 1000° C. to about 1148° C., about 1100° C. to about 1148° C., about 1110° C. to about 1148° C., about 1120° C. to about 1148° C., about 1300° C. to about 1148° C., or about 1140° C. to about 1148° C. An annealing temperature that is less than or equal to about 1150° C. is preferred because it provides a better viscosity match of the core 12 with a downdoped (e.g. F-doped) inner cladding 16, which leads to a reduction in the stress at the interface between core 12 and inner cladding 16 and a lower stress-optic effect in the core 12.

According to an embodiment of the present disclosure, the core 12, outer cladding 14, and optional inner cladding 16 can have any suitable outer radius based on the intended application of the optical fiber 10. For example, the outer cladding 14 can have an outer radius $r_{OC}$ of from about 20 µm to about 100 µm, about 20 µm to about 80 µm, about 20 µm to about 60 µm, about 30 µm to about 100 µm, about 30 µm to about 80 µm, about 30 µm to about 60 µm, about 50 µm to about 100 µm, about 50 µm to about 80 µm, about 50 µm to about 60 µm, about 60 µm to about 100 µm, or about 60 µm to about 80 µm. In some examples, the core 12 can have an outer radius $r_{core}$ of from about 2 µm to about 10 µm, about 2 µm to about 8 µm, about 2 µm to about 6 µm, about 3 µm to about 10 µm, about 3 µm to about 8 µm, about 3 µm to about 6 µm, about 4 µm to about 10 µm, about 4 µm to about 8 µm, or about 4 µm to about 6 µm. In some examples, when present, the inner cladding 16 can have an outer radius $r_{IC}$ of from about 10 µm to about 60 µm, about 10 µm to about 50 µm, about 10 µm to about 40 µm, about 10 µm to about 30 µm, about 10 µm to about 20 µm, about 20 µm to about 60 µm, about 20 µm to about 50 µm, about 20 µm to about 40 µm, about 20 µm to about 30 µm, about 30 µm to about 60 µm, about 30 µm to about 50 µm, about 30 µm to about 40 µm, about 40 µm to about 60 µm, about 40 µm to about 50 µm, or about 50 µm to about 60 µm.

According to one embodiment, the optical fibers of the present disclosure can have a theoretical cutoff wavelength of less than about 1600 nm, less than about 1500 nm, less than about 1400 nm, or less than about 1300 nm. For example, the theoretical cutoff wavelength can be from about 1200 nm to about 1600 nm, about 1200 nm to about 1500 nm, about 1200 nm to about 1400 nm, about 1200 nm to about 1300 nm, about 1300 nm to about 1600 nm, about 1300 nm to about 1500 nm, or about 1300 nm to about 1400 nm.

According to one embodiment, the optical fibers of the present disclosure can have a zero-dispersion wavelength of from about 1200 nm to about 1400 nm. For example, the zero-dispersion wavelength can be from about 1200 nm to about 1400 nm, about 1250 nm to about 1400 nm, about 1300 nm to about 1400 nm, about 1350 nm to about 1400 nm, about 1200 nm to about 1350 nm, about 1200 nm to about 1300 nm, about 1250 nm to about 1350 nm, or about 1250 nm to about 1300 nm.

According to an embodiment, the optical fibers of the present disclosure can have a mode field diameter at 1310 nm of from about 5 µm to about 15 µm. For example, the mode field diameter at 1310 nm can be from about 5 µm to about 15 µm, about 5 µm to about 10 µm, about 7 µm to about 15 µm, about 7 µm to about 10 µm, about 9 µm to about 15 µm, or about 9 µm to about 10 µm.

According to one embodiment, the optical fibers of the present disclosure can have a dispersion having an absolute value at 1310 nm of less than 3 ps/nm/km and a dispersion slope at 1310 nm of less than 0.1 ps/nm$^2$/km. For example, the absolute value of the dispersion at 1310 nm can be from about 0.3 ps/nm/km to about 3 ps/nm/km, about 0.3 ps/nm/km to about 2.75 ps/nm/km, about 0.3 ps/nm/km to about 2.5 ps/nm/km, about 0.3 ps/nm/km to about 2.25 ps/nm/km, about 0.3 ps/nm/km to about 2 ps/nm/km, about 0.3 ps/nm/km to about 1.75 ps/nm/km, about 0.3 ps/nm/km to about 1.5 ps/nm/km, or about 0.3 ps/nm/km to about 1 ps/nm/km. In one example, the dispersion slope at 1310 nm can be from about 0.075 ps/nm$^2$/km to about 0.1 ps/nm$^2$/km, about 0.08 ps/nm$^2$/km to about 0.1 ps/nm$^2$/km, about 0.085 ps/nm$^2$/km to about 0.1 ps/nm$^2$/km, about 0.075 ps/nm$^2$/km to about 0.09 ps/nm$^2$/km, about 0.08 ps/nm$^2$/km to about 0.09 ps/nm$^2$/km, or about 0.085 ps/nm$^2$/km to about 0.09 ps/nm$^2$/km.

According to one embodiment, the optical fibers of the present disclosure can have an effective area ("$A_{eff}$") of at least 50 µm$^2$ at 1310 nm. For example, the optical fiber can have an $\Delta_{eff}$ of from about 50 µm$^2$ to about 100 µm$^2$, about 50 µm$^2$ to about 80 µm$^2$, about 50 µm$^2$ to about 70 µm$^2$, about 50 µm$^2$ to about 60 µm$^2$, about 60 µm$^2$ to about 100 µm$^2$, about 60 µm$^2$ to about 80 µm$^2$, about 60 µm$^2$ to about 70 µm$^2$, about 70 µm$^2$ to about 100 µm$^2$, about 70 µm$^2$ to about 80 µm$^2$, or about 80 µm$^2$ to about 100 µm$^2$ at 1310 nm.

According to one embodiment, the optical fibers of the present disclosure can have a mode field diameter at 1550 nm of from about 5 µm to about 18 µm. For example, the mode field diameter at 1310 nm can be from about 5 µm to about 18 µm, about 5 µm to about 15 µm, about 5 µm to about 12 µm, about 9 µm to about 18 µm, about 9 µm to about 15 µm, about 9 µm to about 12 µm, about 10 µm to about 18 µm, about 10 µm to about 15 µm, or about 10 µm to about 12 µm.

According to an embodiment of the present disclosure, the optical fibers can have a dispersion at 1550 nm of less than 23 ps/nm/km and a dispersion slope at 1550 nm of less than 0.1 ps/nm$^2$/km. For example, the dispersion at 1550 nm can be from about 10 ps/nm/km to about 23 ps/nm/km, about 10 ps/nm/km to about 20 ps/nm/km, about 10 ps/nm/km to about 18 ps/nm/km, about 15 ps/nm/km to about 23 ps/nm/km, about 15 ps/nm/km to about 20 ps/nm/km, about 15 ps/nm/km to about 18 ps/nm/km, about 18 ps/nm/km to about 23 ps/nm/km, or about 18 ps/nm/km to about 20 ps/nm/km. In one example, the dispersion slope at 1550 nm can be about 0.04 ps/nm$^2$/km to about 0.1 ps/nm$^2$/km, about 0.05 ps/nm$^2$/km to about 0.1 ps/nm$^2$/km, about 0.055 ps/nm$^2$/km to about 0.1 ps/nm$^2$/km, about 0.06 ps/nm$^2$/km to about 0.1 ps/nm$^2$/km, about 0.08 ps/nm$^2$/km to about 0.1 ps/nm$^2$/km, about 0.04 ps/nm$^2$/km to about 0.08 ps/nm$^2$/km, about 0.05 ps/nm$^2$/km to about 0.08 ps/nm$^2$/km, about 0.055 ps/nm$^2$/km to about 0.08 ps/nm$^2$/km, about 0.06 ps/nm$^2$/km to about 0.08 ps/nm$^2$/km, about 0.04 ps/nm$^2$/km to about 0.06 ps/nm$^2$/km, about 0.05 ps/nm$^2$/km to about 0.06 ps/nm$^2$/km, or about 0.055 ps/nm$^2$/km to about 0.06 ps/nm$^2$/km.

According to one embodiment, the optical fibers of the present disclosure can have an $A_{eff}$ of at least 50 µm$^2$ at 1550 nm. For example, the optical fiber can have an $A_{eff}$ of from about 50 µm$^2$ to about 200 µm$^2$, about 50 µm$^2$ to about 175 µm$^2$, about 50 µm$^2$ to about 150 µm$^2$, about 50 µm$^2$ to about 125 µm$^2$, about 50 µm$^2$ to about 100 µm$^2$, about 50 µm$^2$ to about 75 µm$^2$, from about 75 µm$^2$ to about 200 µm$^2$, about 75 µm$^2$ to about 175 µm$^2$, about 75 µm$^2$ to about 150 µm$^2$, about 75 µm$^2$ to about 125 µm$^2$, about 75 µm$^2$ to about 100 µm$^2$, from about 100 µm$^2$ to about 200 µm$^2$, about 100 µm$^2$ to about 175 µm$^2$, about 100 µm$^2$ to about 150 µm$^2$, or about 100 µm$^2$ to about 125 µm$^2$ at 1550 nm.

According to an embodiment, the optical fibers of the present disclosure can have a bending loss, as measured by the lateral load test at 1550 nm, of from about 0.1 dB to about 5 dB. For example, the lateral load at 1550 nm can be from about 0.1 dB to about 5 dB, about 0.1 dB to about 4 dB, about 0.1 dB to about 3 dB, about 0.1 dB to about 2 dB, about 0.1 dB to about 1 dB, about 0.1 dB to about 0.5 dB, about 0.2 dB to about 5 dB, about 0.2 dB to about 4 dB, about 0.2 dB to about 3 dB, about 0.2 dB to about 2 dB, about 0.2 dB to about 1 dB, about 0.2 dB to about 0.5 dB, about 1 dB to about 5 dB, about 1 dB to about 4 dB, or about 1 dB to about 3 dB.

According to one embodiment, the optical fibers of the present disclosure can have a bending loss, as measured by the pin array test at 1550 nm, of less than about 25 dB. For example, the pin array bend test loss at 1550 nm can be from about 2 dB to about 25 dB, about 2 dB to about 20 dB, about 2 dB to about 15 dB, about 2 dB to about 10 dB, about 2 dB to about 5 dB, about 5 dB to about 25 dB, about 5 dB to about 20 dB, about 5 dB to about 15 dB, about 5 dB to about 10 dB, about 10 dB to about 25 dB, about 10 dB to about 20 dB, about 10 dB to about 15 dB, about 15 dB to about 20 dB, or about 20 dB to about 25 dB.

Exemplary configurations of the optical fiber 10, Exemplary Optical Fiber A-D, according to embodiments of the present disclosure are shown in Table 1 below and FIG. 2. Table 1 identifies the combination of materials in Exemplary Optical Fibers A-D according to the present disclosure. The core 12, outer cladding 14, and/or inner cladding 16 (when present) can include additional components according to aspects of the present disclosure discussed herein.

TABLE 1

Exemplary Optical Fiber Configurations.

| Exemplary Optical Fiber | Core | Inner Cladding | Outer Cladding |
|---|---|---|---|
| Optical Fiber A | Silica glass doped with about 0.30 wt % ≤ N ≤ about 0.60 wt % & about 0.8 wt % ≤ Cl ≤ about 2 wt % | Silica glass doped with F | Silica glass doped with Cl |
| Optical Fiber B | Silica glass doped with about 0.30 wt % ≤ N ≤ about 0.60 wt % & about 0.8 wt % ≤ Cl ≤ about 2 wt % | Undoped silica glass | Silica glass doped with Cl |
| Optical Fiber C | Silica glass doped with about 0.30 wt % ≤ N ≤ about 0.60 wt % & about 0.8 wt % ≤ Cl ≤ about 2 wt % | Silica glass doped with F | Undoped silica glass |
| Optical Fiber D | Silica glass doped with about 0.30 wt % ≤ N ≤ about 0.60 wt % & about 0.8 wt % ≤ Cl ≤ about 2 wt % | n/a | Undoped silica glass |

Figure 2:
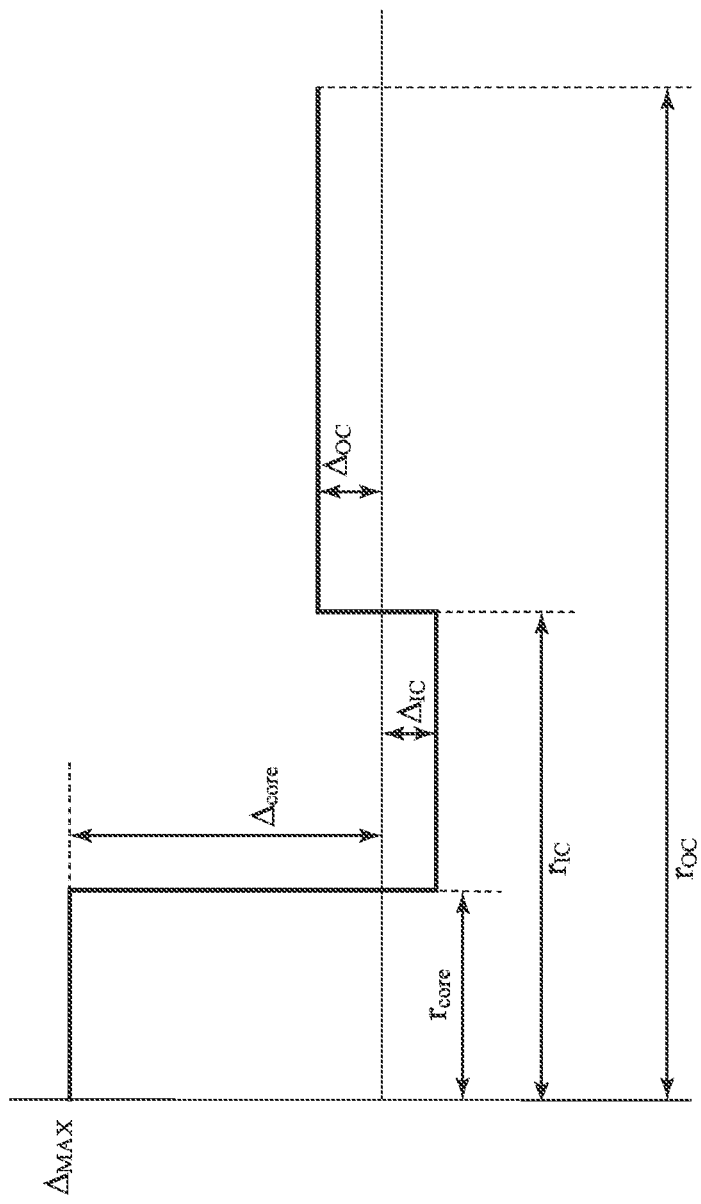
FIG. 2 is a refractive index profile of an optical fiber having a chlorine and nitrogen co-doped silica core, a fluorine-doped inner cladding, and a chlorine-doped outer cladding, according to an embodiment of the present disclosure.

FIG. 2 is a schematic refractive index profile corresponding to an example optical fiber 10 corresponding to Exemplary Optical Fiber A. While the core of Exemplary Optical Fiber A has a step-index core profile, it is understood that the components of Exemplary Optical Fiber A can also be used to form an optical fiber have a graded-index core profile. Any of the Exemplary Optical Fibers B-D may be used to form optical fibers having a step-index core profile or a graded-index core profile.

The optical fibers of the present disclosure can be made according to any suitable process for forming an optical fiber having a core, an outer cladding, and optionally one or more inner claddings. According to one embodiment, the silica glass core co-doped with nitrogen and chlorine can be formed by reacting an undoped silica soot preform doped with a chlorine precursor to form a chlorine-doped silica soot preform and then reacting the chlorine-doped silica soot preform with gaseous $NH_3$ at elevated temperatures to form a chlorine, nitrogen co-doped silica soot preform. According to another embodiment, the silica glass core co-doped with nitrogen and chlorine can be formed by reacting an undoped silica soot preform doped with a gaseous $NH_3$ at elevated temperatures to form a nitrogen-doped silica soot preform and then reacting the nitrogen-doped silica soot preform with a chlorine precursor (e.g., $SiCl_4$) to form a chlorine, nitrogen co-doped silica soot preform.

An undoped silica soot preform can be made using any suitable conventional preform manufacturing technique, such as outside vapor deposition (OVD), modified chemical vapor deposition (MCVD), or plasma activated chemical vapor deposition (PCVD). The OVD, MCVD, PCVD and other techniques for generating silica soot can permit fine control of dopant concentration through layer-by-layer deposition with variable flow rate delivery of dopant precursors. The chlorine-doped silica glass preform can be formed having the desired level of chlorine doping prior to treating the chlorine-doped silica glass preform in a nitridization process to dope the chlorine-doped silica glass with nitrogen according to the embodiments of the present disclosure.

According to one embodiment, the nitridization process of the present disclosure includes exposing a chlorine-doped silica soot preform to gaseous $NH_3$ at elevated temperatures to induce a nitridization reaction between the $SiO_2$ molecules in the silica glass and the gaseous $NH_3$. The reaction between the $SiO_2$ and $NH_3$ can result in the formation of silicon oxynitride in the silica glass, forming silica glass that is co-doped with both chlorine and nitrogen. In another embodiment, the nitridization process of the present disclosure includes exposing an undoped silica soot preform to gaseous $NH_3$ at elevated temperatures to induce a nitridization reaction between the $SiO_2$ molecules in the silica glass and the gaseous $NH_3$ to form a nitrogen-doped silica soot preform. The nitrogen-doped silica soot preform can then be reacted with a chlorine precursor (e.g., $SiCl_4$) to form a chlorine, nitrogen co-doped silica soot preform. The level of nitrogen doping in the sample can be selected based on reaction parameters such as reaction temperature, reaction time, gaseous $NH_3$ pressure, and/or gaseous $NH_3$ flow rate.

According to one embodiment, an undoped silica soot preform is formed in an outside vapor deposition (OVD) process that includes the deposition of silica soot onto a bait rod. After deposition of the soot, the bait rod may be subsequently be removed from the undoped silica soot preform, resulting in a hollow center or open channel extending through a body of the undoped silica soot preform. The undoped silica glass preform can then be mounted within a modified furnace assembly for doping the preform with chlorine by exposure to a Cl doping precursor or for doping the preform with nitrogen by exposure to $NH_3$ gas at elevated temperatures. The furnace assembly for doping can be similar to a furnace assembly used for the OVD process or a consolidation process in that the furnace includes a treating chamber that can be heated and which is capable of maintaining a sealed environment to prevent an uncontrolled exchange of gas between the treating chamber and the exterior environment A preform handle can be coupled with one end of the undoped silica soot preform such that an open channel extending through the preform handle aligns with the open channel in the preform. The preform handle can be mounted on a suitable handle assembly that is capable of supporting the preform within the treating chamber of the furnace assembly. The handle assembly also includes a gas supply conduit that is configured to supply a Cl-doping precursor or gaseous $NH_3$ to the open channel of the preform handle during the doping process.

Doping of an undoped silica soot preform or a nitrogen-doped silica soot preform with chlorine is accomplished by reacting the silica soot preform with a suitable chlorine precursor (e.g., $SiCl_4$) at elevated temperatures (e.g., 1225° C.) to form a chlorine-doped silica glass preform. Examples of suitable precursors for silica include $SiCl_4$ and organosilicon compounds. Organosilicon compounds are silicon compounds that include carbon, and optionally oxygen and/or hydrogen. Examples of suitable organosilicon compounds include octamethylcyclotetrasiloxane (OMCTS), silicon alkoxides $(Si(OR)_4)$, organosilanes $(SiR_4)$, and $Si(OR)_xR_{4-x}$, where R is a carbon-containing organic group or hydrogen and where R may be the same or different at each occurrence, and wherein at least one R is a carbon-containing organic group. Examples of suitable precursors for chlorine doping include $Cl_2$, $SiCl_4$, $Si_2Cl_6$, $Si_2OCl_6$, $SiCl_3H$, and $CCl_4$. The level of chlorine doping can be selected based on reaction parameters such as reaction time, precursor flow rate, and/or precursor gas pressure.

Doping of an undoped silica soot preform or a chlorine-doped silica soot preform with nitrogen is accomplished in a nitridization reaction with a nitridizing gas at elevated temperature. The nitridizing gas includes $NH_3$ gas. The gaseous $NH_3$ can be provided as a mixture of gaseous $NH_3$ and optionally an inert carrier gas at a predetermined ratio and flow rate based on a desired level of nitrogen-doping of the undoped or chlorine-doped silica soot preform. Non-limiting examples of inert carrier gases include gaseous $N_2$, Ar, He, and combinations thereof. The gaseous $NH_3$ flows through the open channel of the preform handle and into the open channel of the undoped or chlorine-doped silica soot preform. The gaseous $NH_3$ can diffuse into the exposed interior portions (e.g. pores) of the undoped or chlorine-doped silica soot preform and react with the $SiO_2$ to incorporate nitrogen as a dopant in the undoped or chlorine-doped silica soot preform. The undoped or chlorine-doped silica soot preform can be heated to elevated temperatures during exposure to gaseous $NH_3$ to facilitate the incorporation of nitrogen in the preform to provide the desired level of nitrogen doping in the undoped or chlorine-doped silica soot preform. Other methods for nitrogen doping of an undoped or chlorine-doped silica soot preform may also be used without deviating from the scope of the present disclosure.

One example of an exemplary nitridization process for an undoped or chlorine-doped silica soot preform can be implemented in a furnace assembly in which a preform having an open channel extending therethrough is supported within the furnace assembly by a handle assembly configured to supply a Cl-doping precursor or gaseous $NH_3$ to the open channel of the preform. For an exemplary undoped or chlorine-doped silica soot preform weighing about 2000 grams, having a channel diameter of about 9.4 mm, and a length of about 1 m, the process parameters can include: heating to about 1000° C. and supplying a 5% $NH_3:N_2$ gas mixture at a flow rate of 1 L/min. to the open channel for about 5 hours. An inert gas, such as He, for example, can be supplied to the furnace assembly muffle at a flow rate of about 10 L/min. The parameters of the nitridization process, such as the nitridization reaction temperature, the amount of $NH_3$ gas supplied, the flow rate of $NH_3$ gas, and the reaction time period, can vary based at least in part on a desired level of nitrogen doping, the dimensions of the preform, and/or whether the silica soot preform is doped or undoped. For example, in one exemplary process, the temperature can be ramped at a predetermined rate (e.g., 5° C./min.) to a nitridization reaction temperature of from about 900° C. to about 1300° C., specific examples of which include 1000° C. and 1100° C. When the temperature reaches a predetermined value or range (e.g., about 800° C.), the supply of a nitridizing gas mixture including $NH_3$ and an inert carrier gas (e.g., gaseous $N_2$) can be started at a predetermined $NH_3:N_2$ ratio based at least in part on a desired level of nitrogen doping and can continue until a predetermined reaction time period has elapsed. An example of suitable reaction time period is about 5-6 hours, although this time can vary based parameters such as $NH_3:N_2$ gas flow rate, reaction temperature, and the desired level of nitrogen doping. Once the reaction time period has elapsed, the chlorine and nitrogen co-doped silica glass preform can be cooled (e.g., at a cooling rate of about 5° C./min.). Once the temperature decreases to a predetermined temperature (e.g., about 800° C.), the gas can be switched to an inert gas (e.g., gaseous $N_2$) at a flow rate of about 0.2 L/min. until the preform is cooled to about room temperature (about 25° C.). Aspects of the nitridization process, such as the reaction temperature, the ratio of $NH_3:N_2$, the flow rate of the nitridizing gas mixture, and/or the reaction time period can be selected to provide a desired level of nitrogen doping in sample.

According to one embodiment, the undoped or chlorine-doped silica soot preform can be treated according to a drying process prior to drawing to form an optical fiber. An exemplary drying process includes annealing an undoped or chlorine-doped silica soot preform in a furnace assembly at about 400° C. for 12 hours with an inert gas (e.g., gaseous $N_2$) at a flow rate of about 0.2 L/min. The annealing process is intended to remove at least a portion of the water present in the undoped or chlorine-doped silica glass preform; the annealing conditions may vary depending on the amount of water to be removed. Without wishing to be bound by any particular theory, it is believed that the nitrogen doping process may introduce hydrogen into the silica soot preform, and thus, according to one embodiment, the drying process may be implemented following the nitridization process.

In some embodiments, the drying process may include heating to an elevated temperature in the presence of a drying agent. Examples of suitable drying agents include chlorine ($Cl_2$), silicon tetrachloride ($SiCl_4$), thionyl chloride ($SOCl_2$), carbonyl chloride ($COCl_2$), or carbon monoxide (CO). In one example, the chlorine and nitrogen co-doped silica glass preform is heated to a temperature of about 1250° C. for about 60 minutes with 5 slpm of a gas mixture including a ratio of gaseous $Cl_2$:He of about 2.4%.

According to one embodiment, the process for forming a nitrogen and chlorine co-doped silica soot preform can include: forming a chlorine-doped silica soot preform, nitrogen doping the chlorine-doped silica soot preform to form a nitrogen and chlorine co-doped silica soot preform, and drying the nitrogen and chlorine co-doped silica soot preform. In another embodiment, the process for forming a nitrogen and chlorine co-doped silica soot preform can include: forming a nitrogen-doped silica soot preform, drying the nitrogen-doped silica soot preform, and chlorine doping the dried, nitrogen-doped silica soot preform to form a nitrogen and chlorine co-doped silica soot preform. In yet another embodiment, the process for forming a nitrogen and chlorine co-doped silica soot preform can include: forming a nitrogen-doped silica soot preform, chlorine doping the nitrogen-doped silica soot preform to form a nitrogen and chlorine co-doped silica soot preform, and drying the nitrogen and chlorine co-doped silica soot preform. The chlorine doping, nitrogen doping, and drying can be implemented according to any of the processes described herein. It will be understood that other processes may be utilized for any one or more of the steps of chlorine doping, nitrogen doping, and drying and that additional, intermediary steps may also be implemented without deviating from the scope of the present disclosure.

Following the drying process, the chlorine and nitrogen co-doped silica soot preform can be consolidated in a conventional consolidation process. For example, the chlorine and nitrogen co-doped silica soot preform can be heated to a temperature of about 1490° C. to consolidate the preform in preparation for a fiber drawing process or other applications.

The consolidated chlorine and nitrogen co-doped silica glass preform can be further processed based on the end use application of the preform. According to one embodiment, the consolidated chlorine and nitrogen co-doped silica glass preform can be directly drawn into an optical fiber. In another embodiment, the consolidated chlorine and nitrogen co-doped silica glass preform can be further processed to collapse the open channel left behind following removal of the bait rod by heating the preform in a furnace and then drawing the preform into an optical fiber. In one example, collapsing of the open channel can include heating the consolidated chlorine and nitrogen co-doped silica glass preform to a temperature of from about 1700° C. to about 2200° C. The channel may be at least partially collapsed prior to drawing into an optical fiber. According to some embodiments, the consolidated chlorine and nitrogen co-doped silica glass preform can be at least partially collapsed and used as a core cane in an optical fiber. In one example, the chlorine and nitrogen co-doped core cane can be used with an undoped or doped silica cladding to form an optical fiber having a chlorine and nitrogen co-doped core.

Without wishing to be bound by any theory, it is believed that co-doping the silica glass with chlorine can at least partially offset the effect of nitrogen doping on the viscosity of silica glass. The embodiments of the present disclosure demonstrate that nitrogen doping of silica glass can be used to incrementally increase the refractive index of the glass. However, as the level of nitrogen doping in silica glass increases, the viscosity of the glass may also increase, which can result in an increase in attenuation of the optical fiber. While chlorine doping of silica can also incrementally increase the refractive index of the glass, the degree of increase is less than that of nitrogen dopants. However, chlorine doping can decrease the viscosity of a glass and thus the addition of chlorine dopants can result in a nitrogen-doped silica glass having a lower viscosity than would be exhibited by glasses that did not include chlorine dopants. The embodiments of the present disclosure include co-doping silica glass with nitrogen to utilize nitrogen to effect the refractive index of silica in combination with chlorine to utilize the effect of chlorine on the viscosity of the glass to provide a co-doped silica glass having the desired relative refractive index and viscosity.

EXAMPLES

The following examples describe various features and advantages provided by the disclosure, and are in no way intended to limit the invention and appended claims.

Example 1

Exemplary nitrogen-doped silica glass samples, Examples 1A and 1B, were prepared and the refractive index was measured to evaluate the relationship between nitrogen doping of silica glass and the refractive index of the doped glass. Examples 1A and 1B were both prepared by reacting an OVD silica soot blank with gaseous $NH_3$ to form a nitrogen doped silica glass article. The silica soot blank was placed inside a sample cage supported within a furnace assembly and a gas supply conduit was coupled with the sample cage to supply the nitridizing gas to the silica soot blank, with the outlet of the gas supply conduit spaced less than about 10 cm from the silica soot blank. The OVD silica soot blanks for both Examples 1A and 1B (prior to doping) had a density of about 0.7 g/cm³. The samples were annealed and then doped as described above by exposing the silica soot blank to a nitridizing gas flow of 5% $NH_3$ and 95% $N_2$ gas for different reaction times. Example 1A was exposed to the nitridizing gas at a flow rate of about 1 U/min. for about 2.5 hours at a reaction temperature of about 1000° C. Example 1B was exposed to the nitridizing gas at a flow rate of about 1 L/min. for about 5 hours at a reaction temperature of about 1000° C. The reaction temperature corresponds to the temperature of the soot blank at the time of exposure to the nitridizing gas. Following the nitridizing process, both Examples 1A and 1B were consolidated in a consolidation furnace by moving the soot blank through a sinter zone having 6 temperature zones with a temperature transition from about 1000° C. to about 1495° C. at a rate of about 5 mm/min. The refractive index of Example 1A and 1B was determined as a function of nitrogen doping concentration. Nitrogen doping concentration for each sample was determined by elemental analysis, as described above.

Figure 3A:
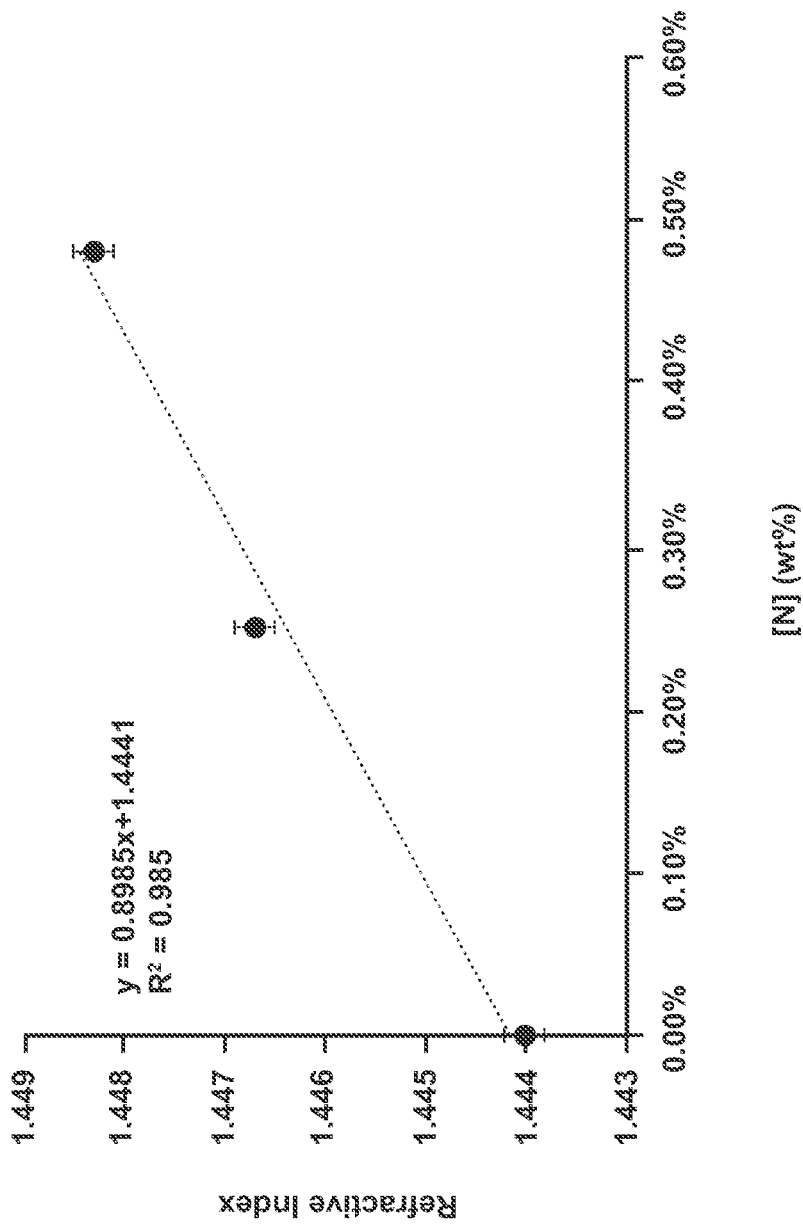
FIG. 3A is a plot of refractive index of a nitrogen-doped silica glass article as a function of nitrogen concentration, according to an embodiment of the present disclosure.
Figure 3B:
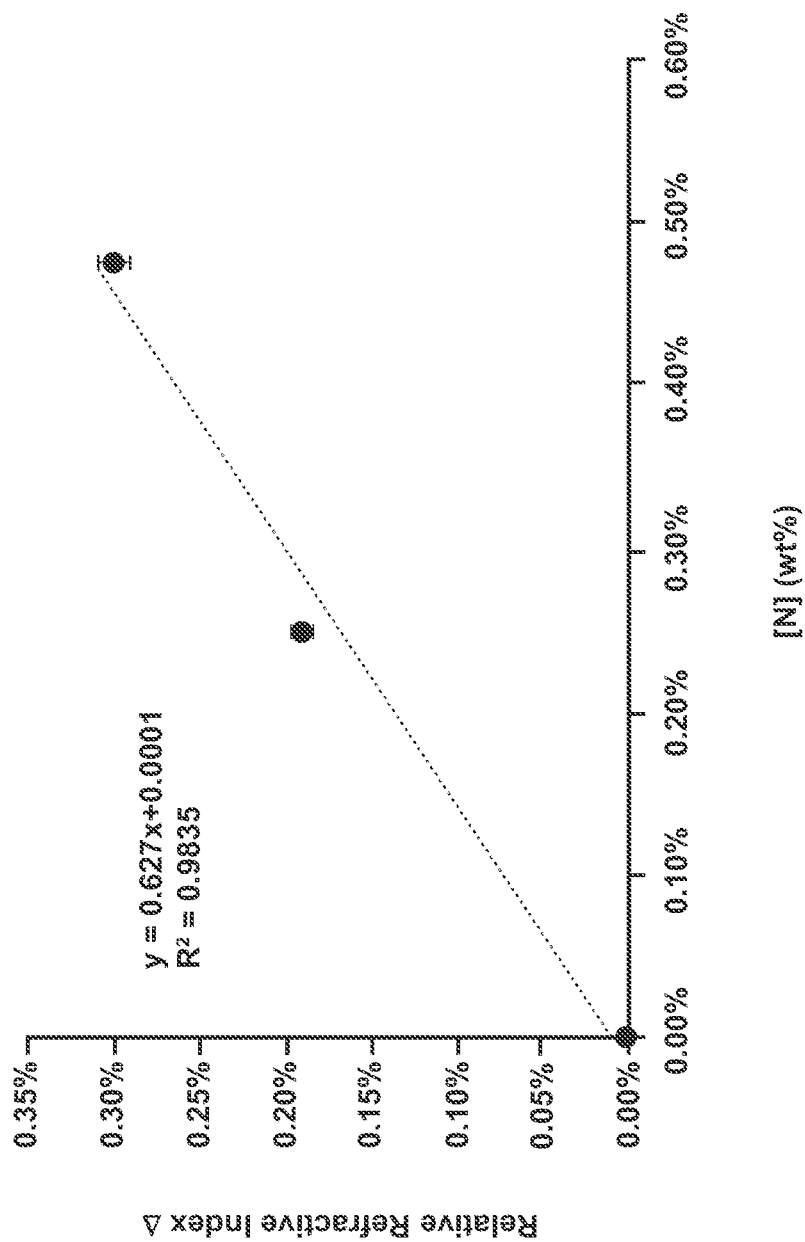
FIG. 3B is a plot of relative refractive index $\Delta$ of a nitrogen-doped silica glass article as a function of nitrogen concentration, according to an embodiment of the present disclosure.

FIGS. 3A and 3B show the refractive index at 1549 nm and relative refractive index Δ(%) at 1549 nm for Examples 1A and 1B. As demonstrated by the data in FIGS. 3A and 3B, nitrogen dopants can increase the refractive index of silica in a generally linear manner at a rate of about 0.0009 per 0.1 wt % of nitrogen. The data in FIGS. 3A and 3B demonstrate that nitrogen can be used to dope silica glass to incrementally increase the refractive index of silica glass in a predictable manner.

Example 2

Figure 4:
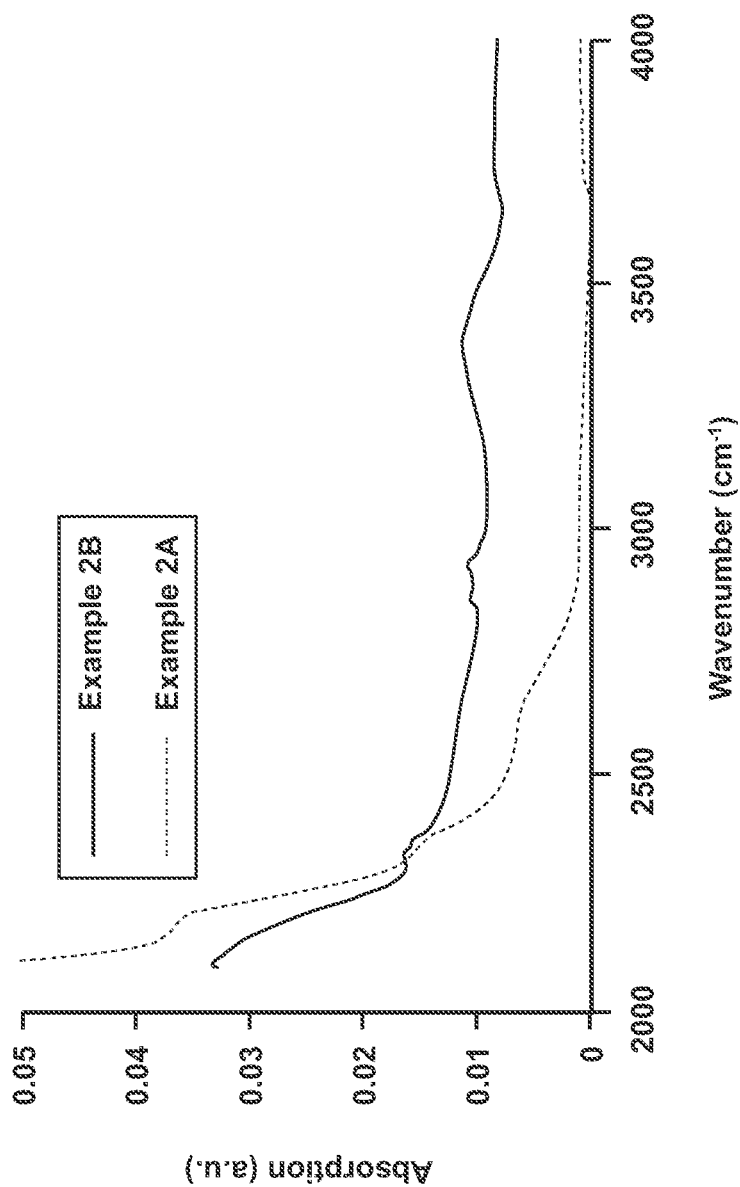
FIG. 4 is a plot of FTIR spectra for nitrogen-doped silica glass articles with and without a drying treatment, according to an embodiment of the present disclosure.

Exemplary nitrogen-doped silica glass samples, Examples 2A and 2B, were prepared in a manner similar to that described above for Example 1A of Example 1, except that Example 2A was also treated in a drying process. The drying process included heating Example 2A at 1250° C. for 60 min. with 5 slpm of a drying gas consisting of 2.4% $Cl_2$/97.6% He. FIG. 4 is a plot of a Fourier-transform infrared spectroscopy (FTIR) spectrum for Examples 2A and 2B. The peak in the spectrum of Example 2B around 3400 $cm^{-1}$ is indicative of the presence of NH and/or $NH_2$ species in the sample. Without wishing to be bound by any particular theory, it is believed that NH and/or $NH_2$ species may increase the attenuation of the doped glass, and thus it may be desirable to minimize or remove these species. The spectrum for Example 2A demonstrates that the drying process can decrease the amount of NH and/or $NH_2$ species present in the glass.

Neither Example 2A nor 2B show an absorption band around 3600 $cm^{-1}$ that is typically indicative of the presence of OH species, which may also increase attenuation. Without wishing to bound by any theory, it is believed that the absence of the OH band in the FTIR spectra may be due to (a) a dehydration reaction of $NH_3$ with Si—OH to form water and Si—$NH_2$ species and/or (b) a reaction of Si—OH groups with SiON during consolidation to form $SiO_2$ and SiNH. It is believed that drying with a drying agent, such as $Cl_2$ gas, may directly remove NH and/or $NH_2$ species and/or remove OH groups that can generate NH and $NH_2$ species.

Examples 2A and 2B were consolidated in a conventional consolidation process at a temperature of about 1490° C. and the nitrogen dopant content of each sample was determined. Elemental analysis showed that Example 2B (sample without drying) had a nitrogen content of 0.25 wt %. Example 2A, which was prepared in the same manner as Example 2B, and which was also treated in the drying process, has a nitrogen content of 0.22 wt %. This data indicates that the majority of nitrogen dopants were retained in the samples, even after being treated in a drying and consolidation process.

Example 3

Exemplary nitrogen and chlorine co-doped silica glass samples, Examples 3A-3L, were prepared at different levels of chlorine and nitrogen doping and the annealing temperature was determined. All of the samples were prepared with a ratio of chlorine and nitrogen doping to produce a co-doped silica glass sample having a relative refractive index Δ of about 0.35%. The dopant concentrations and viscosity for each sample is shown in Table 2 below. Examples 3A-3L were prepared by nitrogen-doping a chlorine-doped silica soot blank in a vertical furnace. Chlorine doped silica soot blanks were prepared by reacting a silica soot preform with $SiCl_4$ to obtain the different levels of chlorine doping for each of the examples of Table 2 prior to nitrogen doping. The chlorine-doped silica soot blanks weighed about 2000 grams, were 1 meter long, and were attached to a preform handle having an open centerline channel with an internal diameter of about 9.4 mm. Nitrogen doping was performed by supplying a nitridizing gas mixture including $NH_3$ and $N_2$ into an interior of the silica soot blank through the open centerline channel of the preform handle. The temperature during the nitrogen-doping reaction, the ratio and flow rate of the $NH_3$:$N_2$ nitridizing gas mixture, and the nitrogen-doping reaction time period were varied to obtain the different levels of nitrogen-doping shown in Table 2. For example, Example 3C was made by supplying a 5% $NH_3$:$N_2$ nitridizing gas mixture at 1 L/min. to the interior of the chlorine-doped silica soot blank for about 5 hours at a reaction temperature of about 1000° C. The different levels of nitrogen-doping can be achieved by varying parameters of the nitridization process, including reaction time, reaction temperature, $NH_3$ concentration, and/or $NH_3$ flow rate, etc. In preparing Examples 3A-3L, it is assumed that there is a linear relationship between nitrogen-doping concentration and reaction time. Examples 3A-3B and 3D-3L were prepared in the same manner as Example 3C, except that the reaction time was varied to provide the desired relative increase or decrease in nitrogen doping. For example, the reaction times for Examples 3A-3L were as follows: 4.5 hours for Example 3A; 4.8 hours for Example 3B; 5 hours for Example 3C; 5.3 hours for Example 3D; 5.6 hours for Example 3E; 5.6 hours for Example 3F; 5.8 hours for Example 3G; 6 hours for Example 3H; 6.3 hours for Example 3I; 6.5 hours for Example 3J; 6.8 hours for Example 3K; 7 hours for Example 3L.

TABLE 2

Annealing Temperature for Exemplary Co-doped Examples 3A-3L

| Example | [Cl] (wt %) | [N] (wt %) | Rel. Ref. Index Δ | Annealing Temperature (° C.) | ΔT compared to 1148° C. (° C.) |
|---|---|---|---|---|---|
| 3A | 2 | 0.36 | 0.35% | 1093 | −55 |
| 3B | 1.8 | 0.38 | 0.35% | 1104 | −44 |
| 3C | 1.6 | 0.40 | 0.35% | 1115 | −33 |
| 3D | 1.4 | 0.42 | 0.35% | 1127 | −21 |
| 3E | 1.2 | 0.44 | 0.35% | 1140 | −8 |
| 3F | 1.1 | 0.45 | 0.35% | 1148 | 0 |
| 3G | 1 | 0.46 | 0.35% | 1154 | 6 |
| 3H | 0.8 | 0.48 | 0.35% | 1169 | 21 |
| 3I | 0.6 | 0.50 | 0.35% | 1188 | 40 |
| 3J | 0.4 | 0.52 | 0.35% | 1211 | 63 |
| 3K | 0.2 | 0.54 | 0.35% | 1247 | 99 |
| 3L | 0 | 0.56 | 0.35% | 1424 | 276 |

The relative refractive index Δ of 0.35% and annealing temperature was selected as the basis for an illustrative comparison of the embodiments of the present disclosure. An example of a conventional standard single mode optical fiber has a core that includes silica doped with about 8 wt % Ge and about 200 ppm (wt) Cl, and which is characterized by a relative refractive index Δ of 0.35% and an annealing temperature of 1148° C. The data in Table 2 show that the embodiments of the present disclosure can be used to provide a doped silica glass having a relative refractive index Δ of 0.35% that is free of Ge and which exhibits the same or lower viscosity (i.e., the same or lower annealing temperature) compared to a standard single mode optical fiber. The data in Table 2 shows that the relative amounts of chlorine and nitrogen dopants in the silica glass can be selected to provide a relative refractive index Δ of 0.35%, in the absence of added Ge, and further selected to provide a desired annealing temperature of 1148° C. or less.

Figure 3C:
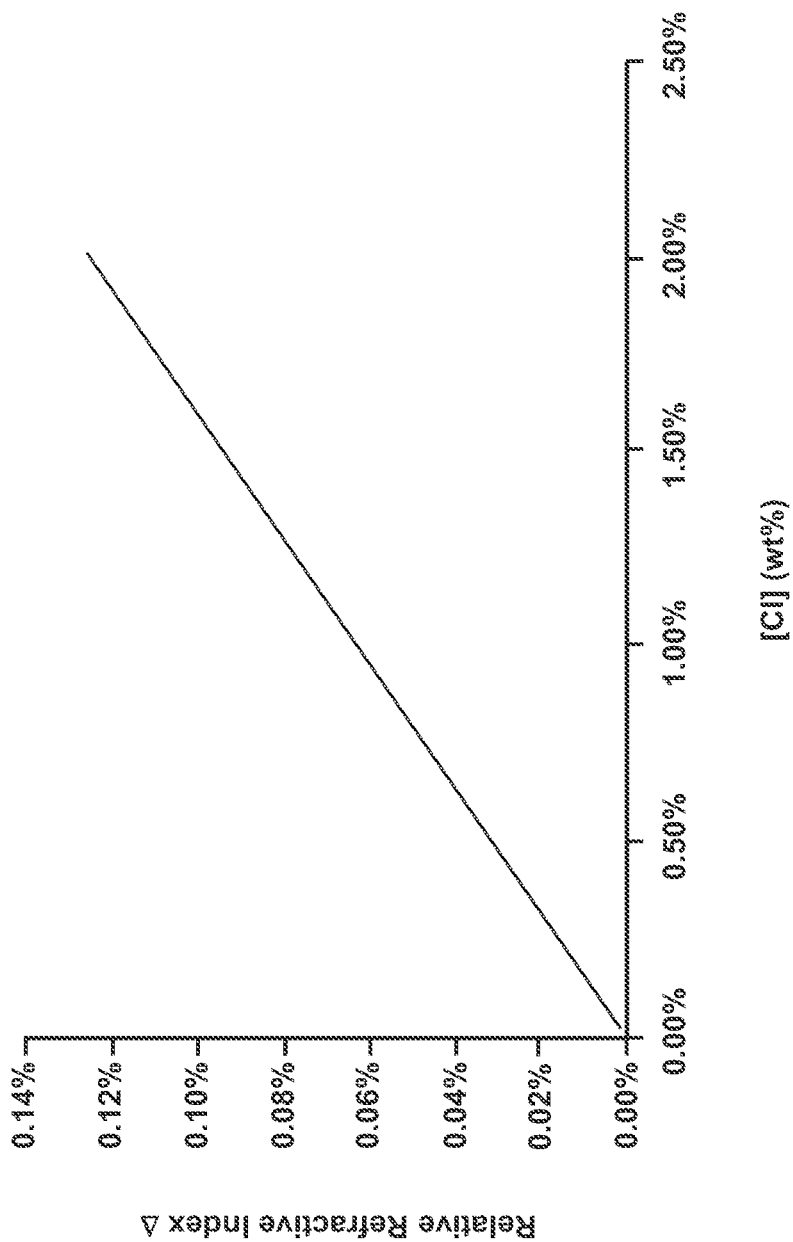
FIG. 3C is a plot of relative refractive index $\Delta$ of a chlorine-doped silica glass article as a function of chlorine concentration, according to an embodiment of the present disclosure.

The relative refractive index Δ of 0.35% and annealing temperature was selected for the basis of illustration only. It is understood that the embodiments of the present disclosure include chlorine and nitrogen co-doped silica glass optical fibers having a range of relative refractive indices Δ and annealing temperatures, as desired. FIG. 3B indicates that the relative refractive index Δ varies approximately linearly with nitrogen doping concentration and increases by approximately 0.627% for each 1 wt % of nitrogen doping. FIG. 3C indicates that the relative refractive index Δ varies approximately linearly with Cl doping concentration and increases by approximately 0.063% for each 1 wt % of Cl doping. As a result, various combinations of nitrogen doping concentration and Cl doping concentration can be used to produce nitrogen and chlorine co-doped silica glass cores having a relative refractive $Δ_{core}$ that spans a wide range. For example, additional, non-limiting exemplary chlorine and nitrogen co-doped silica glass optical fibers are described below in Example 4.

Figure 5:
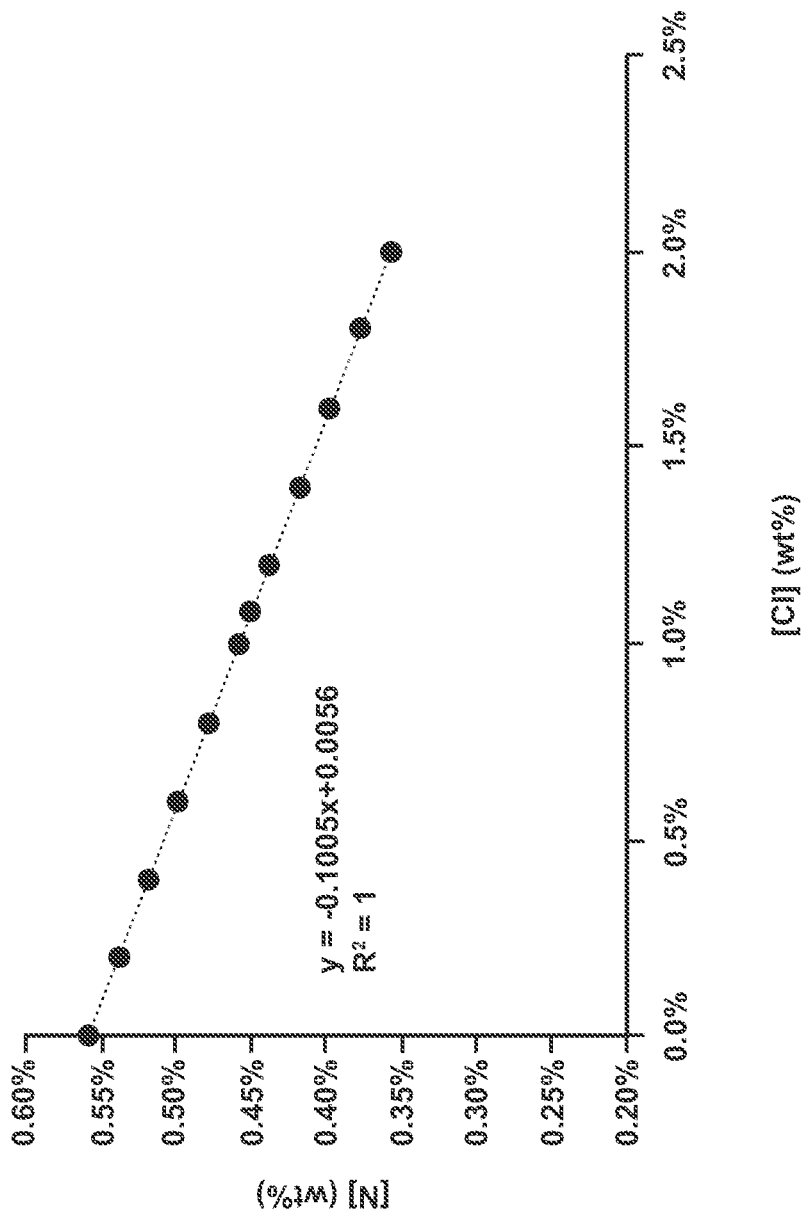
FIG. 5 is a plot of chlorine dopant concentration in a chlorine and nitrogen co-doped silica glass article having a relative refractive index $\Delta$ of 0.35% as a function of nitrogen dopant concentration, according to an embodiment of the present disclosure.

The data in Table 2 demonstrates that the ratio of chlorine and nitrogen dopants in the sample can affect the viscosity of the glass, as measured by determining the annealing temperature. FIG. 5 illustrates a plot of chlorine concentration as a function of nitrogen concentration. The data in Table 2 and FIG. 5 demonstrates that the doping level of chlorine and nitrogen can be selected in concert to provide a sample with a desired viscosity at a given relative refractive index. The equation for a linear least squares regression analysis fit of the data in FIG. 5 (Formula I) can be used to determine the relative amounts of chlorine and nitrogen doping to provide a sample having a relative refractive index Δ of 0.35% at a desired viscosity:

$$y = -0.1005x + 0.0056 \quad (I)$$

wherein y is the amount of nitrogen (in percent by weight), x is the amount of chlorine (in percent by weight), and wherein x is less than or equal to about 2 wt %. A similar process can be used to determine the relative amounts of chlorine and nitrogen doping that can provide a sample having a desired viscosity at other relative refractive indices.

Example 4

Table 3 below provides the details and optical properties for modeled exemplary chlorine and nitrogen co-doped silica core optical fibers, Examples 4A-4G.

TABLE 3

Features and Optical Properties of Examples 4A-4G

| Parameter | Ex. 4A | Ex. 4B | Ex. 4C | Ex. 4D | Ex. 4E | Ex. 4F | Ex. 4G |
|---|---|---|---|---|---|---|---|
| $\Delta_1$ (%) | 0.34 | 0.33 | 0.34 | 0.347 | 0.27 | 0.2 | 0.27 |
| Cl in core (wt %) | 1.5 | 1.8 | 2 | 2 | 2 | 1 | 1.2 |
| N in core (wt %) | 0.392 | 0.345 | 0.341 | 0.352 | 0.230 | 0.218 | 0.310 |
| $r_{core}$ (μm) | 4.2 | 4.3 | 4.9 | 5.1 | 5.5 | 5.8 | 6.9 |
| $\Delta_2$ (%) | 0 | 0 | −0.07 | 0 | 0 | −0.05 | 0 |
| inner cladding dopant | none | none | F | none | none | F | none |
| $r_{IC}$ (μm) | n/a | n/a | 14.8 | 15.4 | n/a | 50 | 21 |
| $\Delta_3$ (%) | 0 | 0 | 0 | 0.07 | 0 | 0 | 0.05 |
| outer cladding dopant | none | none | none | Cl | none | none | Cl |
| $r_{OC}$ (μm) | 62.5 | 62.5 | 62.5 | 62.5 | 62.5 | 62.5 | 62.5 |
| Theoretical Cutoff wavelength (nm) | 1299 | 1297 | 1329 | 1329 | 1515 | 1523 | 1509 |
| Zero-dispersion wavelength (nm) | 1303 | 1305 | 1289 | 1278 | n/a | n/a | n/a |
| Mode field diameter at 1310 nm (μm) | 9.1 | 9.2 | 9.1 | 9.3 | n/a | n/a | n/a |
| Effective area at 1310 nm (μm$^2$) | 64.9 | 66.7 | 68.6 | 72.0 | n/a | n/a | n/a |
| Dispersion at 1310 nm (ps/nm/km) | 0.56 | 0.41 | 2.55 | 2.87 | n/a | n/a | n/a |
| Dispersion Slope at 1310 nm (ps/nm$^2$/km) | 0.0843 | 0.0850 | 0.0881 | 0.0888 | n/a | n/a | n/a |
| Mode field diameter at 1550 nm (μm) | 10.3 | 10.5 | 10.0 | 10.2 | 12.0 | 12.5 | 13.1 |
| Effective area at 1550 nm (μm$^2$) | 81.2 | 83.6 | 80.1 | 83.3 | 113.3 | 122.9 | 142 |
| Dispersion at 1550 nm (ps/nm/km) | 16.9 | 16.9 | 19.6 | 20.1 | 19.8 | 19.9 | 21.5 |
| Dispersion Slope at 1550 nm (ps/nm$^2$/km) | 0.0567 | 0.0572 | 0.0587 | 0.0593 | 0.0599 | 0.0605 | 0.0619 |
| Pin array at 1550 nm (dB) | 10.0 | 12.5 | 3.6 | 2.4 | 12.7 | 19.6 | 20.9 |
| Lateral load at 1550 nm (dB) | 0.20 | 0.24 | 0.13 | 0.15 | 0.86 | 1.43 | 3.89 |

The following non-limiting aspects are encompassed by the present disclosure. To the extent not already described, any one of the features of the first through the twenty-ninth aspect may be combined in part or in whole with features of any one or more of the other aspects of the present disclosure to form additional aspects, even if such a combination is not explicitly described.

According to a first aspect of the present disclosure, an optical fiber includes: a core including silica co-doped with nitrogen and chlorine, the core having a relative refractive index $\Delta_{core}$ and a radius $r_{core}$; and an outer cladding surrounding the core, the outer cladding having a relative refractive index $\Delta_{OC} < \Delta_{core}$.

According to a second aspect of the present disclosure, the optical fiber of aspect 1, wherein the core includes an annealing temperature of less than or equal to about 1150° C.

According to a third aspect of the present disclosure, the optical fiber of aspect 1 or aspect 2, wherein nitrogen is co-doped in the core in an amount of from about 0.30 wt % to about 0.60 wt %.

According to a fourth aspect of the present disclosure, the optical fiber of any one of aspects 1-3, wherein chlorine is co-doped in the core in an amount of from about 0.8 wt % to about 2 wt % chlorine.

According to a fifth aspect of the present disclosure, the optical fiber of any one of aspects 1-4, wherein the relative refractive index $\Delta_{core}$ is in a range from about 0.15% to about 0.45%.

According to a sixth aspect of the present disclosure, the optical fiber of aspect 5, wherein the relative refractive index $\Delta_{core}$ is about 0.35%.

According to a seventh aspect of the present disclosure, the optical fiber of any one of aspects 1-6, wherein the radius $r_{core}$ is in a range from about 2 μm to about 10 μm.

According to an eighth aspect of the present disclosure, the optical fiber of any one of aspects 1-7, wherein the relative refractive index $\Delta_{OC}$ is greater than or equal to 0.

According to a ninth aspect of the present disclosure, the optical fiber of any one of aspects 1-8, wherein the outer cladding includes one of undoped silica or silica doped with chlorine.

According to a tenth aspect of the present disclosure, the optical fiber of any one of aspects 1-9, further including: an inner cladding surrounding the core and disposed between the core and the outer cladding, wherein the inner cladding has a relative refractive index $\Delta_{IC}$ that is less than or equal to 0.

According to an eleventh aspect of the present disclosure, the optical fiber of aspect 10, wherein the inner cladding includes one of undoped silica or silica doped with fluorine.

According to a twelfth aspect of the present disclosure, the optical fiber of aspect 10 or aspect 11, wherein the inner cladding has a radius $r_{IC}$ in a range of from about 10 μm to about 50 μm.

According to a thirteenth aspect of the present disclosure, the optical fiber of aspect 10 or aspect 11, wherein the inner cladding has a radius $r_{IC}$ in a range of from about 10 μm to about 30 μm.

According to a fourteenth aspect of the present disclosure, the optical fiber of any of aspects 1-13, wherein an amount of nitrogen and an amount of chlorine co-doped in the core is based on formula (I): y=−0.1005x+0.0056 (I) wherein y is the amount of nitrogen (in percent by weight), x is the amount of chlorine (in percent by weight), and wherein x is less than or equal to about 2 wt %.

According to a fifteenth aspect of the present disclosure, the optical fiber of any one of aspects 1-14, wherein the core is substantially free of germanium.

According to a sixteenth aspect of the present disclosure, an optical fiber includes: a core including silica co-doped with from about 0.30 wt % to about 0.60 wt % nitrogen and from about 0.8 wt % to about 2 wt % chlorine, the core having a relative refractive index $\Delta_{core}$ in a range of from about 0.15% to about 0.45%; and an outer cladding surrounding the core and having a relative refractive index $\Delta_{OC} < \Delta_{core}$.

According to a seventeenth aspect of the present disclosure, the optical fiber of aspect 16, wherein nitrogen is co-doped in the core in an amount of from about 0.35 wt % to about 0.50 wt %.

According to an eighteenth aspect of the present disclosure, the optical fiber of aspect 16 or aspect 17, wherein chlorine is co-doped in the core in an amount of from about 1.1 wt % to about 2 wt % chlorine.

According to a nineteenth aspect of the present disclosure, the optical fiber of any one of aspects 16-18, wherein the relative refractive index $\Delta_{core}$ is about 0.35%.

According to a twentieth aspect of the present disclosure, the optical fiber of any one of aspects 16-19, wherein the core has a radius $r_{core}$ in a range of from about 2 µm to about 10 µm.

According to a twenty-first aspect of the present disclosure, the optical fiber of any one of aspects 16-20, wherein an annealing temperature of the core is less than or equal to about 1150° C.

According to a twenty-second aspect of the present disclosure, the optical fiber of any one of aspects 16-21, wherein the relative refractive index $\Delta_{OC}$ is greater than or equal to 0.

According to a twenty-third aspect of the present disclosure, the optical fiber of any one of aspects 16-22, wherein the outer cladding includes one of undoped silica or silica doped with chlorine.

According to a twenty-fourth aspect of the present disclosure, the optical fiber of any one of aspects 16-23, further including: an inner cladding surrounding the core and disposed between the core and the outer cladding, wherein the inner cladding has a relative refractive index $\Delta_{IC}$ less than or equal to 0.

According to a twenty-fifth aspect of the present disclosure, the optical fiber of aspect 24, wherein the inner cladding includes one of undoped silica or silica doped with fluorine.

According to a twenty-sixth aspect of the present disclosure, the optical fiber of aspect 24 or aspect 25, wherein the inner cladding has a radius $r_{IC}$ in a range of from about 10 µm to about 50 µm.

According to a twenty-seventh aspect of the present disclosure, the optical fiber of aspect 24 or aspect 25, wherein the inner cladding has a radius $r_{IC}$ in a range of from about 10 µm to about 30 µm.

According to a twenty-eighth aspect of the present disclosure, the optical fiber of any one of aspects 16-27, wherein an amount of nitrogen and an amount of chlorine co-doped in the core is based on formula (I): y=−0.1005x+0.0056 (I) wherein y is the amount of nitrogen (in percent by weight), x is the amount of chlorine (in percent by weight), and wherein x less than or equal to about 2 wt %.

According to a twenty-ninth aspect of the present disclosure, the optical fiber of any one of aspects 16-28, wherein the core is substantially free of germanium.

Many variations and modifications may be made to the above-described embodiments of the disclosure without departing substantially from the spirit and various principles of the disclosure. All such modifications and variations are intended to be included herein within the scope of this disclosure and protected by the following claims. It will be understood that any described processes or steps within described processes may be combined with other disclosed processes or steps to form structures within the scope of the present disclosure. The exemplary structures and processes disclosed herein are for illustrative purposes and are not to be construed as limiting.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

What is claimed is:

1. An optical fiber, comprising:
    a core comprising silica co-doped with a wt % of nitrogen and a wt % of chlorine that is greater than the wt % of nitrogen, the core having a relative refractive index $\Delta_{core}$ and a radius $r_{core}$; and
    an outer cladding surrounding the core, the outer cladding having a relative refractive index $\Delta_{OC} < \Delta_{core}$.

2. The optical fiber of claim 1, wherein the core comprises an annealing temperature of less than or equal to about 1150° C.

3. The optical fiber of claim 1, wherein the nitrogen is co-doped in the core in an amount of from about 0.30 wt % to about 0.60 wt %.

4. The optical fiber of claim 1, wherein the chlorine is co-doped in the core in an amount of from about 0.8 wt % to about 2 wt %.

5. The optical fiber of claim 1, wherein the relative refractive index $\Delta_{core}$ is in a range from about 0.15% to about 0.45%.

6. The optical fiber of claim 1, wherein the radius $\Delta_{core}$ is in a range from about 2 µm to about 10 µm.

7. The optical fiber of claim 1, further comprising:
    an inner cladding surrounding the core and disposed between the core and the outer cladding, wherein the inner cladding has a relative refractive index $\Delta_{IC}$ that is less than or equal to 0.

8. The optical fiber of claim 7, wherein the inner cladding comprises one of undoped silica or silica doped with fluorine.

9. The optical fiber of claim 7, wherein the inner cladding has a radius $r_{IC}$ in a range of from about 10 µm to about 50 µm.

10. The optical fiber of claim 1, wherein an amount of the nitrogen and an amount of the chlorine co-doped in the core is based on formula (I):

$$y=-0.1005x+0.0056 \qquad (I)$$

wherein y is the amount of the nitrogen (in percent by weight), x is the amount of the chlorine (in percent by weight), and wherein x is less than or equal to about 2 wt %.

11. The optical fiber of claim 1, wherein the core is substantially free of germanium.

12. An optical fiber, comprising:
    a core comprising silica co-doped with from about 0.30 wt % to about 0.60 wt % nitrogen and from about 0.8 wt % to about 2 wt % chlorine, the core having a relative refractive index $\Delta_{core}$ in a range of from about 0.15% to about 0.45%; and
    an outer cladding surrounding the core and having a relative refractive index $\Delta_{OC} < \Delta_{core}$.

13. The optical fiber of claim 12, wherein the core has a radius $r_{core}$ in a range of from about 2 µm to about 10 µm.

14. The optical fiber of claim 12, wherein an annealing temperature of the core is less than or equal to about 1150° C.

15. The optical fiber of claim 12, wherein the outer cladding comprises one of undoped silica or silica doped with chlorine.

16. The optical fiber of claim 12, further comprising:
an inner cladding surrounding the core and disposed between the core and the outer cladding, wherein the inner cladding has a relative refractive index $\Delta_{IC}$ less than or equal to 0.

17. The optical fiber of claim 16, wherein the inner cladding comprises one of undoped silica or silica doped with fluorine.

18. The optical fiber of claim 16, wherein the inner cladding has a radius $r_{IC}$ in a range of from about 10 μm to about 50 μm.

19. The optical fiber of claim 12, wherein an amount of the nitrogen and an amount of the chlorine co-doped in the core is based on formula (I):

$$y=-0.1005x+0.0056 \qquad (I)$$

wherein y is the amount of the nitrogen (in percent by weight), x is the amount of the chlorine (in percent by weight), and wherein x less than or equal to about 2 wt %.

20. The optical fiber of claim 12, wherein the core is substantially free of germanium.

* * * * *

UNITED STATES PATENT AND TRADEMARK OFFICE
CERTIFICATE OF CORRECTION

| | |
|---|---|
| PATENT NO. | : 11,500,149 B2 |
| APPLICATION NO. | : 17/236558 |
| DATED | : November 15, 2022 |
| INVENTOR(S) | : Richard Michael Fiacco et al. |

It is certified that error appears in the above-identified patent and that said Letters Patent is hereby corrected as shown below:

In the Claims

In Column 24, Line 31, in Claim 6, delete "$\Delta_{core}$" and insert -- $r_{core}$ --.

Signed and Sealed this
Eighth Day of August, 2023

Katherine Kelly Vidal
*Director of the United States Patent and Trademark Office*